(12) United States Patent
Cohen-Solal et al.

(10) Patent No.: US 7,028,269 B1
(45) Date of Patent: Apr. 11, 2006

(54) MULTI-MODAL VIDEO TARGET ACQUISITION AND RE-DIRECTION SYSTEM AND METHOD

(75) Inventors: Eric Cohen-Solal, Ossining, NY (US); Mi-Suen Lee, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/488,028

(22) Filed: Jan. 20, 2000

(51) Int. Cl.
*G09G 5/00* (2006.01)

(52) U.S. Cl. .................. 715/863; 715/716; 715/862; 382/103; 382/311; 382/312

(58) Field of Classification Search ........... 345/862, 345/863, 727, 716; 382/103, 255, 286, 293, 382/311, 312; 348/169; 715/862, 863, 727, 715/716
See application file for complete search history.

(56) References Cited

U.S. PATENT DOCUMENTS

| | | | |
|---|---|---|---|
| 4,471,683 A | 9/1984 | Brown | 89/1 A |
| 4,951,079 A | 8/1990 | Hoshino et al. | 354/412 |
| 5,027,149 A | 6/1991 | Hoshino et al. | 354/412 |
| 5,471,542 A | 11/1995 | Ragland | 382/128 |
| 5,521,634 A * | 5/1996 | McGary | 348/169 |
| 5,600,765 A | 2/1997 | Ando et al. | 345/433 |
| 5,652,849 A * | 7/1997 | Conway et al. | 345/716 |
| 5,749,000 A | 5/1998 | Narisawa | 396/121 |
| 5,878,274 A * | 3/1999 | Kono et al. | 710/8 |
| 5,884,249 A * | 3/1999 | Namba et al. | 704/9 |
| 5,982,420 A * | 11/1999 | Ratz | 348/171 |
| 6,005,610 A * | 12/1999 | Pingali | 348/169 |
| 6,067,112 A * | 5/2000 | Wellner et al. | 348/211.4 |
| 6,118,888 A * | 9/2000 | Chino et al. | 382/118 |
| 6,377,296 B1 * | 4/2002 | Zlatsin et al. | 348/143 |
| 6,593,956 B1 * | 7/2003 | Potts et al. | 348/14.09 |

FOREIGN PATENT DOCUMENTS

| | | |
|---|---|---|
| WO | 97/08896 | 3/1997 |
| WO | WO9932959 | 7/1999 |

OTHER PUBLICATIONS

Kahn et al., "Real-time Gesture Recognition with the Perseus System" 1996 [http/citeseer.nj.nec.com].*

(Continued)

*Primary Examiner*—Tadesse Hailu
(74) *Attorney, Agent, or Firm*—Larry Liberchuk

(57) ABSTRACT

The present invention relates generally to the field of video-camera systems, such as a video conferencing systems, and more particularly to video camera targeting systems that locate and acquire targets using an input characterizing a target and a machine-classification system to assist in target acquisition responsively to that input. In some embodiments, the characterization and classification are employed together with one or more inputs of other modalities such as gesture-control. In one example of the system in operation, an operator is able to make pointing gestures toward an object and, simultaneously speak a sentence identifying the object to which the speaker is pointing. At least one term of the sentence, presumably, is associated with a machine-sensible characteristic by which the object can be identified. The system captures and processes the voice and gesture inputs and re-positions a PTZ video camera to focus on the object that best matches both the characteristics and the gesture. Thus, the PTZ camera is aimed based upon the inputs the system receives and the system's ability to locate the target by its sensors.

13 Claims, 10 Drawing Sheets

OTHER PUBLICATIONS

Vladimir I. Pavlovic and Lalitha Devi., "Speech/Gesture Integration for Display Control," 1998.*
Sowa et al., "Temporal Symbolic Integration Applied to a Multimodal System Using Festure and Speech," 1999 [http/citeseer.nj.nec.com].*
Mark Billinghurst, "Put That Where? Voice and Gesture at the Graphics Interface," Nov. 1998.*
Tom Brøndsted, et al "The IntelliMedia WorkBench A Generic Environment For Multimodal Systems," (1998).*
Indrajit Poddar, et al "Toward Natural Gesture/Speech HCI: A Case Study of Weather Narration," (1998).*
Michael Johnston, "Unification-based Multimodal Integration," (1997).*
Bastian Leibe, "The perspecitive Workbench: Towards Spontaneous and Natural Interaction in Simi-Immersive Virtual Environment," (1999).*
Christopher R. Wren, et al, "Combining Audio and Video in Perceptive Spaces," The MIT Media Laboratory, Dec. 13-14, 1999, Dublin, Ireland.*
Gopal Pingali, et al, "Audio-Visual Tracking for Natural Interactivity," Bell Laboratories, Oct. 1999.*
Marcelo Kallmann, et al, "Direct 3D interaction with Smart Objects," Swiss Federal Institute of Technology, CH-1015, 1999.*
Wren, et al., "Pfinder: Real-Time Tracking of the Human Body", MIT Media Laboratory Perceptual Computing Section Technical Report No. 353 (reported as published in IEEE Transactions on Pattern Analysis and Machine Intelligence, Jul. 1997, vol. 19, No. 7, pp. 780-785).

* cited by examiner

MULTI-MODAL VIDEO TARGET ACQUISITION AND RE-DIRECTION SYSTEM AND METHOD

FIELD OF THE INVENTION

The present invention relates generally to the field of video-camera systems, such as a video conferencing systems, and more particularly to video camera targeting systems that locate and acquire targets using an input characterizing a target and a machine-classification system to assist in target acquisition responsively to that input.

BACKGROUND OF THE INVENTION

Video targeting and tracking systems that respond to user commands to change, or acquire, a target is a rapidly-growing field. The speed of computers and, consequently, the speed of image-processing and speech processing are such that very convenient mechanisms for aiming and re-aiming cameras can be provided. In video-conferencing systems, for example, a user can point to an object of interest to position a zoom-capable camera on a PT base. Such automated systems are more intuitive and easier to control than conventional systems that require more explicit commands such as voice-command ("command-control," basically a speech-based symbol processor where each verbal command corresponds to an instruction, for example "PAN—LEFT," "UP," "DOWN'" etc.), joystick control, and continuous target tracking. Continuous tracking systems typically track moving objects using a camera with an image detector to capture images of an object. These captured images are then processed to find and track the object. When a camera is used to capture the images, and the object being tracked moves far away from the center of the camera's field of view, the camera's aim is adjusted to continue the tracking process.

One system that employs such "smart" technology to allow the control of a camera is described in a U.S. patent application Ser. No. 08/996,677, filed Dec. 23, 1997, entitled System and Method for Permitting Three-Dimensional Navigation Through a Virtual Reality Environment Using Camera-Based Gesture Inputs, the entirety of which is incorporated herein by reference. This patent application discusses art in which a camera distinguishes the profiles of human subjects from the background using image-processing techniques. The image-processing techniques use metrics and other image-processing techniques relating to the target to distinguish the subject from the background. The subjects can then be followed by a pan/tilt/zoom (PTZ) camera. Such a system can repeatedly position, zoom, and focus on a target so that the target remains relatively centered on the screen.

Another technique, such as described in U.S. Pat. No. 5,187,574, is referred to as virtual or electronic zoom. Video information from one or more fixed cameras is processed electronically such that the target of interest remains visible in a desired configuration in the output video signal despite the fact that the object may not be centered in the field of view of any particular camera. Through extraction and interpolation operations, the tracking process can be accomplished through fixed cameras, which are generally less expensive than PTZ cameras.

Although capable of tracking a target, these systems lack the ability or the flexibility to locate the target to be acquired and tracked. These systems must either rely on an operator to first select the object, or the object must exhibit a property that the system is preconfigured to detect.

Another improvement is described in detail in the article "'Finger-Pointer': Pointing interface by Image Processing" by Masaaki Fukumoto, Yasuhito Suenga and Kenji Mase. In this article, the authors describe a system that directs a camera to focus on a target by having an operator located within the field of view of the system point to that target. The system scans and processes the image of the operator's finger, which directs a camera to be aimed in that general direction. The article also describes a system using a combination of pointing gestures and voice commands. Through the use of simple voice or gesture commands, the operator can direct the camera to perform simple functions, such as zoom in or out, or clear the screen.

One obvious problem associated with this system results from the misdirection of the camera to an object or target that the operator did not intend to target. Sources of this problem include operator error (i.e., the operator did not precisely point to the desired direction), system error (i.e., the system did not correctly interpret the operator's gesture), and inherent ambiguity (i.e., the information in the gesture is insufficient to define a target coordinate unambiguously). For example, the likelihood that the camera will focus on the wrong target will increase if multiple objects are found along the trajectory of the pointed direction or if there are multiple objects within close proximity to the targeted object. Manually redirecting the camera can be time-consuming, nullify any benefit from having such an automated system. Further, operating an advanced video system, whether by physically re-aiming the camera or through voice commands, is a wasteful distraction.

SUMMARY OF THE INVENTION

The present invention relates generally to the field of video-camera systems, such as a video conferencing systems, and more particularly to video camera targeting systems that locate and acquire targets using an input characterizing a target and a machine-classification system to assist in target acquisition responsively to that input. In some embodiments, the characterization and classification are employed together with one or more inputs of other modalities such as gesture-control.

In one example of the system in operation, an operator is able to make pointing gestures toward an object and, simultaneously speak a sentence identifying the object to which the speaker is pointing. At least one term of the sentence, presumably, is associated with a machine-sensible characteristic by which the object can be identified. The system captures and processes the voice and gesture inputs and re-positions a PTZ video camera to focus on the object that best matches both the characteristics and the gesture. Thus, the PTZ camera is aimed based upon the inputs the system receives and the system's ability to locate the target by its sensors.

In this example, the system receives information concerning the location of the object by processing the pointing gestures of the operator. The system also receives information about the object through a speech recognition processor that converts the voice inputs of the operator into symbols that can be correlated to one or more machine-sensible characteristics. The characteristic is stored as a vector containing values or value ranges corresponding to the system's sensors and is used for locating and acquiring the object. This conversion process is explained in more detail below.

In one embodiment of the invention, information via one modality, e.g., the voice directions, may characterize the target directly or identify it in a way that can be correlated to a machine-sensible characterization. That information can then be used to locate, or assist in the location of, the intended target. If the speech information is extracted from normal speech, and also is not the sole channel through which information target information is obtained (e.g., it is also supplied by gestures) a clear advantage is obtained in that it greatly reduces the need for a training. Because of the oversupply of information about the target, direction indicated by pointing, characterization by speech, etc. and the fact that information is extracted from natural modes of communication, an individual may control the video system without any training at all. The camera may be aimed by the operator/speaker using intuitive gestures, speech, or other inputs.

The use of inputs of multiple modalities can help insure that the system is accurately targeted. One benefit of using multi-modal inputs is the reduction of system or human error by reducing ambiguity in the totality of commands. This loosens the demands on the operator because inherently ambiguous instructions can be compensated for by a large supply of information. The system selects the targeted object through the use of multi-modal criteria to refine the system's search for the target. The various criteria provide the system with information to help identify the most likely target and to eliminate false target options.

In an embodiment, a video camera monitors the gestures of an operator located within the view of a video camera or other sensor. The operator triggers the locating process by pointing to an object (the target). The pointing gesture can consist of extending a finger towards the target, moving a hand in the direction of the targeted object, or any other signal that the system can sense to establish a pointing trajectory. The pointing gesture may serve as one input and may also serve as a triggering event which initiates a process of gathering and deciphering inputs of other modalities which are substantially simultaneous with the triggering event.

The trigger in this embodiment may be the operator's pointing gesture towards the targeted object. Alternatively, the trigger can also be a trigger word or phrase spoken by the operator, e.g., "Please direct your attention to . . . " or any other possible triggering action, such as pressing a button on a remote control or snapping of the fingers.

In this particular embodiment, at approximately the time that the operator triggers the locating process, the system also captures and parses the voice commands of the operator. These voice commands, or voice inputs, may provide the basis for an input of a second modality. Note that speech that occurs before the triggering event may also be captured by buffering the speech and only processing a portion bracketed by silent pauses before and after a trigger event has occurred. Alternatively, the speech may be converted to compact symbols at all times and the resulting symbols time-tagged to determine simultaneity. The symbols, be they text, or tokens associated with a limited set of speech terms, are used to correlate machine-sensible features that relate to the speech that occurs substantially simultaneously with the trigger event.

The voice input, through the use of a speech recognition operator, is processed to establish a second criterion to assist with locating and identifying the target. The voice input can comprise one or a number of terms that describe the targeted object, such as the generic name of the object (a barrel), the color of the object (orange or transparent), the texture/material of the object (shiny), a noise emanating from the object (pounding noise), the shape of the object (oval, high aspect ratio), the movement of the object (bouncing, crawling, vibrating), the size of the object (large, about 3 ft. wide), the temperature of the object (hot), or any other feature of the object (blinking light) that the system is capable of identifying through its sensors. These sensors can include a multitude and/or a combination of different sensors such as infrared sensors to measure heat and a sound source locator to locate sound.

The conversion of a verbal input to criteria for assisting with locating the targeted object can be accomplished in different ways. One possible way is to convert the voice input to a target vector by which the system, through its sensors, can search for, and identify, the correct target from a group of possible targets. The conversion may be through a speech classifier, which classifies different sounds in the input and relates them to target features in the form of target vectors or templates with which objects in a current scene can be compared to determine if a match is found. For example, the term "orange" can be converted to a target vector. To do this, it is not necessary to convert the audio input to text since that is one type of classifier. The end result required is one or more vectors of machine-sensible parameters that can be compared to images to provide a match estimate between the target and a current image. For another example, the speech containing the word "hot" can be correlated to a target vector for use with an infrared camera or heat sensor. Multiple sensory inputs may be used in combination forming target a vector containing parameters with temperature, color, shape (e.g., moments of shape outlines in processed images), sound, etc.

The association between terms and the target features can be recorded in a look-up table, which associates the terms to the comparison criteria. For example, the phrase "please direct your attention to the sleeping cat on top of the red table" may cause the system to parse out the terms "sleeping," "cat," "top of," "red," and "table." Other terms are simply not contained in the look-up-table. The "found" terms are then converted to search criteria, which assist with locating targets that may fit these criteria and to identify the target.

The identification of terms of the sentence as relational terms, e.g., top of, and other terms such as adverbs, adjectives, etc. can be considered during processing and is a factor in determining the criteria upon which a comparison of selected targets is made. An analysis of the sentence structure may be used to give higher or exclusive priority to certain terms, e.g., the direct object, by which the target vector is established. Other grammatical parsing may be used to identify other important key terms in a sentence, such as an adjective that describes the direct object.

The conversion method may parse out all terms identified within the system's look-up table and establish search criteria or target vectors without regard to the grammatical structure of the sentence. This conversion method would filter out non machine-sensible and other irrelevant terms because the feature vectors associated with them would never match the image classifier. Although simpler than the previously described method, it is more likely to result in a misidentification due to its inability to distinguish between relevant and irrelevant criteria based on the sentence structure. For example, in the above example, the system may not be able to determine which object the operator intended to focus on, the table or the cat.

Preferably, the inputs are buffered so that those inputs immediately prior to and following the triggering event may be distinguished. The system may contain a buffer to capture inputs that occur substantially prior to and after the triggering event. So, for example, if an operator says "as seen in the painting" and then subsequently makes a pointing gesture that is interpreted as a trigger, the buffer would still capture all the relevant speech.

After the system acquires a target, the operator can provide feedback to the system by affirming or rejecting its decision. The system can identify the selected object in various ways, including highlighting an image of the object on the screen, making a beeping sound, or simply zooming in on the object and displaying the image on a monitor. If the target is incorrect, the operator may also provide additional inputs to assist the system in making another selection. Such additional inputs can include commands such as "to the right," "not that shoe," "no, the larger object," etc. The additional inputs can also include non-voice inputs, such as a signal from a joystick to direct the system or additional pointing gestures.

In this embodiment, after the system correctly identifies the object, the system may track the object until it receives another signal, either by voice or other inputs, to redirect the camera back to the speaker or to a different target.

The process of identifying the target can be altered and/or refined. In the above-described embodiment, the camera immediately focuses on the area most likely to contain the targeted object. In an alternative embodiment, the camera can scan an area in the immediate vicinity of the operator and progress outwardly in the pointing direction until an adequate match based upon the inputs is made. The system may also locate the closest object or target in the general pointing direction and proceed to the next closest object or target until a satisfactory match is made based on the proximity of various objects to the operator. In yet another alternative embodiment, the system can analyze every object in the general pointing direction and compare each target to the criteria established by the inputs to compute a numerical value based on the likelihood that each target is the intended target. The system can then select and display the targets from the most likely match to the least likely match.

In an alternative embodiment, the system, prior to the triggering event, can continuously scan the entire room, including all objects and potential targets located in the room. Potential targets may be identified based on various criteria including: changes in the scene since the last use of the system, proximity of the objects to the camera, aspect ratio of objects in the scene, uniformity of color fields, etc. By storing information about the room and the location and characteristics of the targets before the triggering event, the system can more quickly acquire the target after the trigger event and inputs are received.

The addition of an updateable look-up table can provide a basis for the system to learn and improve. Through use, the system can learn by associating inputs with certain characteristics. By refining and expanding its look-up table (dictionary) through the addition and association of certain learned terms with certain target vectors, the system can improve its ability to choose the correct object. For example, the system, by comparing targets with the as of yet unknown term "mauve," the system may ultimately establish an association between the term "mauve" and objects having certain ranges in the color space. This learning process can occur through actual use of the system, during an initial programming process established by the manufacturer, by downloading information from other systems with a larger or more refined look up table, or by a number of other methods available such as sharing of data of other systems through a network to combine the learning experience of various systems.

The system can also learn non-target characteristics. For example, the system can learn targets are usually located in a particular area of the room. The system can also learn the targeting behaviors of individual operators. For example, the system can learn that a particular individual targets an object by completely extending his arm towards the object and can therefore disregard false signals, such as inadvertent gestures.

In yet another alternative embodiment, the system can associate different areas of the room into different sectors with each sector being a possible input. For example, the operator can say "System, focus on the chair in sector 4," or "Locate the floral arrangement in the table sector." In the previous example, the system would direct the camera toward sector 4 and locate and target the chair in sector 4.

The invention will be described in connection with certain preferred embodiments, with reference to the following illustrative figures so that it may be more fully understood.

With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail that is necessary for a fundamental understanding of the invention, the description taken with the drawings making apparent to those skilled in the art how the several forms of the invention may be embodied in practice.

DETAILED DESCRIPTION OF THE PREFERRED EMBODIMENT

Figure 1A:
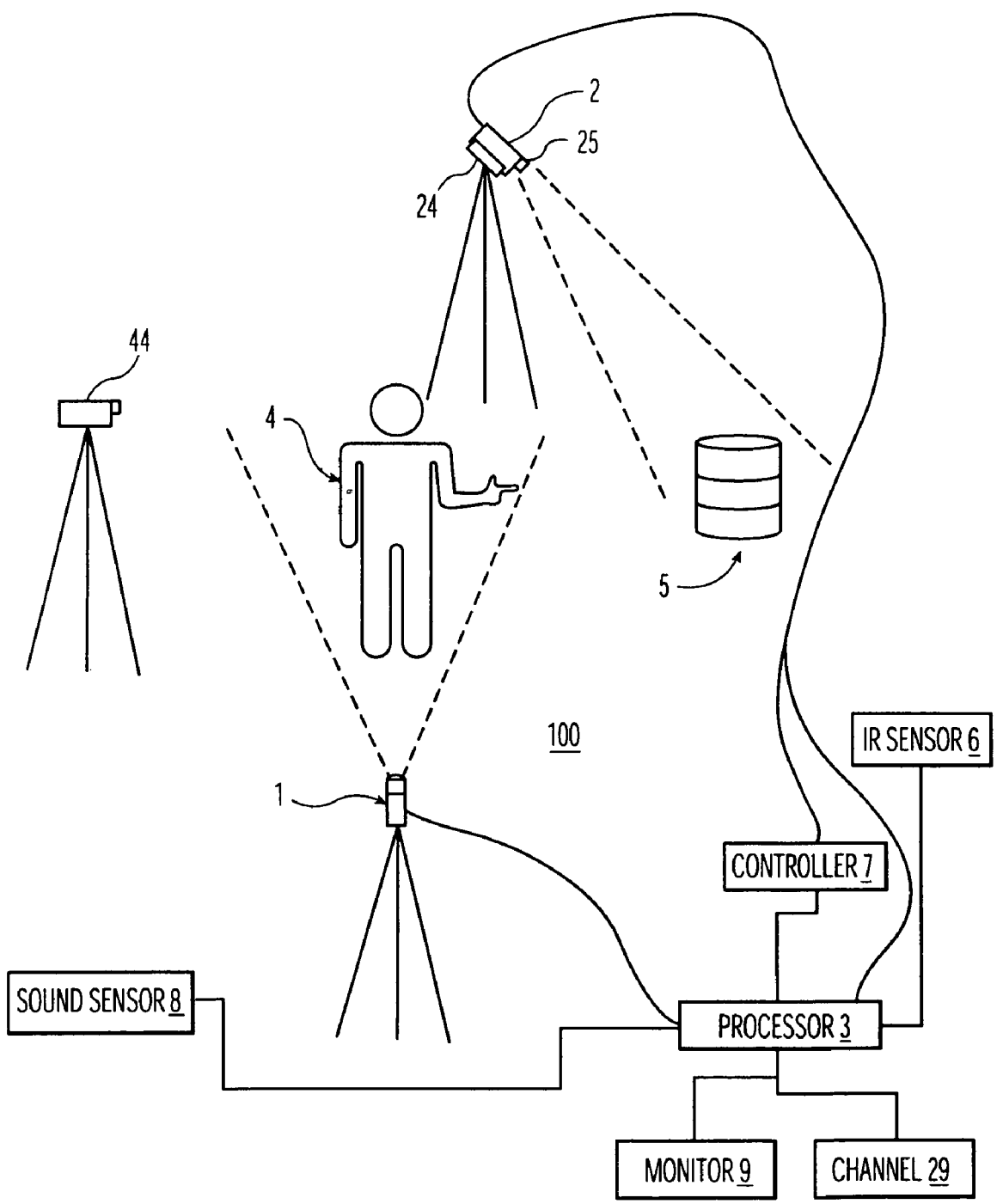
FIG. 1A is a drawing depicting a two camera system according to one embodiment of the invention.

Referring now to FIG. 1A, according to one embodiment of the invention, a tracking video system is automatically controlled by a speaker 4. A subject camera 1 (and, possibly another subject camera 44 depending on the technology used for identifying a pointing trajectory, subject acquisition and targeting, etc.) and a target camera 2 are trained on the speaker 4 and a target object 5, respectively. In the current embodiment, the speaker's 4 gestures and voice are used to control the object camera 2 to aim it targets of interest. The object camera 2 is mounted on a swivel base 24, which allows panning and tilting or other movements. The target camera is also equipped with a zoom lens 25. Both the zoom lens 25 and the swivel base 24 are under the control of a processor 3.

The processor receives input about the gestures and speech of the speaker 4 via video signals from the subject camera 1 and a sound sensor 8, respectively. The processor classifies speech of the speaker 4 to obtain information about the intended target at which the target camera 2 is to be aimed. The latter information about the target is data that can be correlated with machine-sensible characteristics of the target. One set of machine-sensible characteristics is the video image of the target obtained from the target camera 2. Another set of machine-sensible characteristics may also be used by the processor 3 to help identify the intended target. For example an infrared sensor 6 may be used.

The subject camera 1 captures the gestures of an operator 4, and the target camera 2 captures an image of a target 5 for display on a monitor 9 and a communications channel 29. The ultimate destination of the video data, the communications channel 29, may be a broadcast transmitter, a network connection to one or more video output devices, or any of a variety of different destinations.

The processor 3 performs image processing on the image from the subject camera 1. From the image of the speaker 4 and the sound inputs, the processor 3 identifies any of a number of events that may indicate the speaker's wish to redirect the target camera 2. The triggering event could be a gesture or a sequence of words, for example. One triggering event, which also provides information about the location of the new target is a pointing gesture.

Coincident with a triggering event, the processor 3 may parse information received from all of its sensors 1, 2, 6, 8, and attempts to classify this information to identify a location of the target. The processor 3, through a controller 7, directs the target camera 2 toward the new target.

Figure 1B:
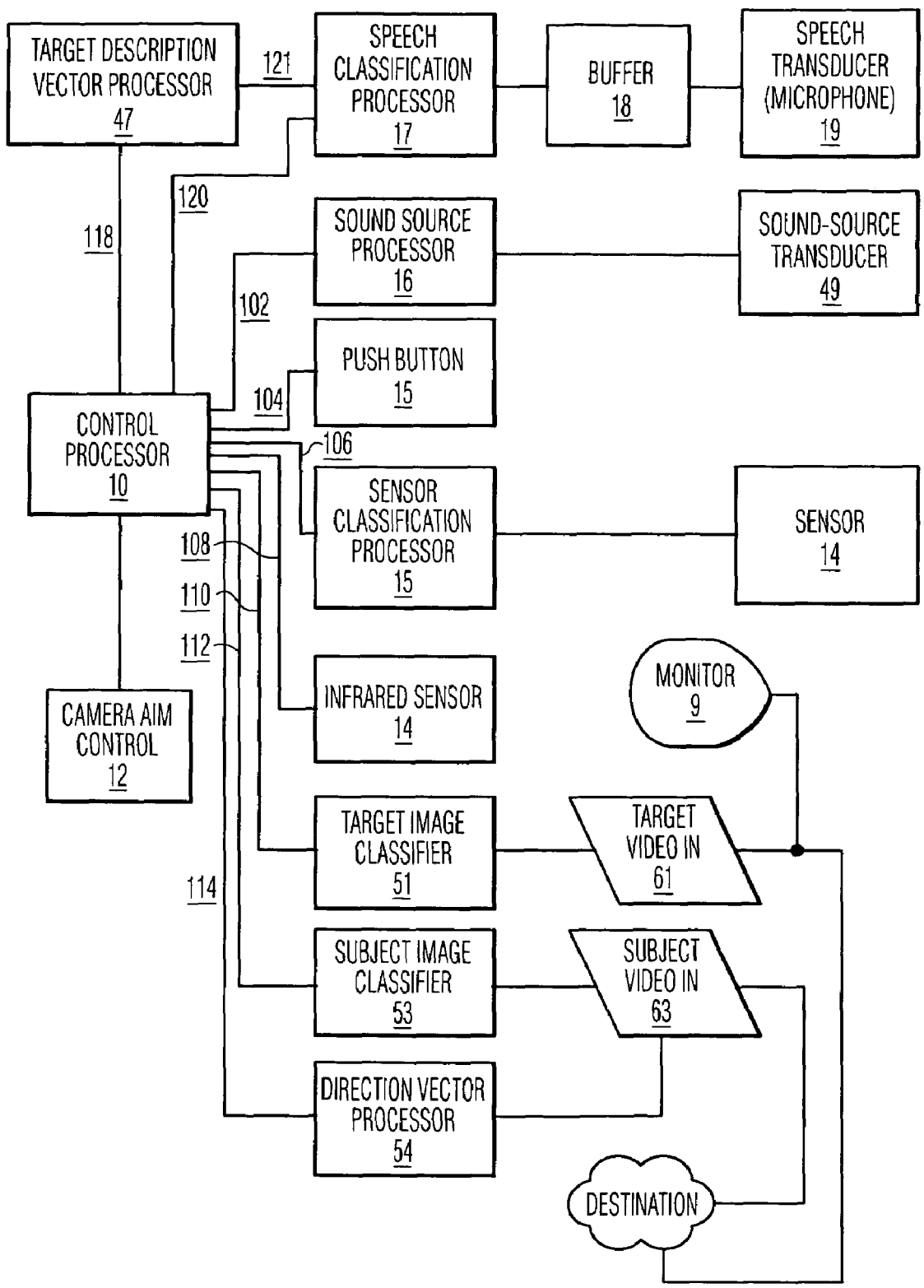
FIG. 1B is a block diagram of one embodiment of the invention.

Referring now also to FIG. 1B, speech is initially picked up by a sound transducer or microphone 19. The speech is buffered in a memory or other suitable device 18. The speech is classified, in a classification processor 17, into various different classes such as triggering events (e.g., the words "please direct you attention . . ."), descriptors (e.g., the color "red," "round," or "barrel"). The descriptors may be packaged as target vectors in a processor 47 and delivered to a control processor 10. Certain classification results may be automatically delivered to the Processor controller 10 directly. For example, data 120 may include triggering events that cause the control processor to take, upon receipt of a triggering event, the most target description vector 118 that transmitted most contemporaneously with the receipt of the trigger event indication 120. Note that a target vector may be assembled by the target vector processor 47 only when a trigger event is received at its input 121 so that data stream 118 contains one or more target vectors only when a trigger event indicator is received at 121.

Within the target vector processor 47, a stream of classes is received and buffered. These classes identify various descriptors, trigger events, etc. The class indicators can be serially numbered in a mod-2 or mod-3 fashion to indicate those that occur simultaneously. The simultaneity of a series of classes can be identified with those classes that were generated between two pauses assumed to bracket a sentence. Alternatively, they can be the series of classes occurring within a specified time range on either side of a triggering event. In the latter case many of the classes would lack a serial number because they fell outside the time interval surrounding a triggering event. Still another alternative is to parse grammatically the sentence structure using word recognition and a grammatical level of classification. Then descriptors that fall within a same sentence would have the same serial number. The above processes will be clarified in connection with an example sequence of events below.

The control processor 10 receives various inputs. A sound source transducer 49, which could be an array of microphones to pinpoint the source of sounds, applies a signal to a sound source processor 16 which applies a position vector 102 to control processor 10. If the target emits a sound, this information can be used to locate the target based on the source vector 102.

A push-button 15 provides an auxiliary input, for example, it could be a triggering event to indicate the speaker's desire to aim the target camera 2 at a new target. The effect of the push-button trigger event could be the same as that for the speech trigger event.

The tracking system 100, has a number of functional components that indicate how processor 3 is able to identify triggering events, pointing trajectories, target images, speech and other sounds, etc. A process/controller 10 communicates with a speaker camera 1 and a target camera 2. The speaker camera 1 is used to capture images/gestures of an operator and the target camera 2 is used to capture images of a target. The processor/controller 10 aims or positions the target camera 2 based upon the inputs received by its sensors. In this particular embodiment, the sensors include the speaker camera 1 for capturing the gestures of the operator; the target camera 2 for receiving visual characteristics of possible targets; and an infrared sensor 14 for locating sources of heat, e.g., body heat from a person, and for determining the temperatures of possible targets. The system also includes a joystick with a push button 15 for receiving commands from the operator, such as information concerning the location of the target, positive or negative feedback from the operator, or a trigger signal; a sound source location sensor 16 for locating objects emitting sounds; and a combination of a speech recognition processor 17, a buffer 18, and a speech transducer 19 for receiving and processing voice inputs.

Figure 2:
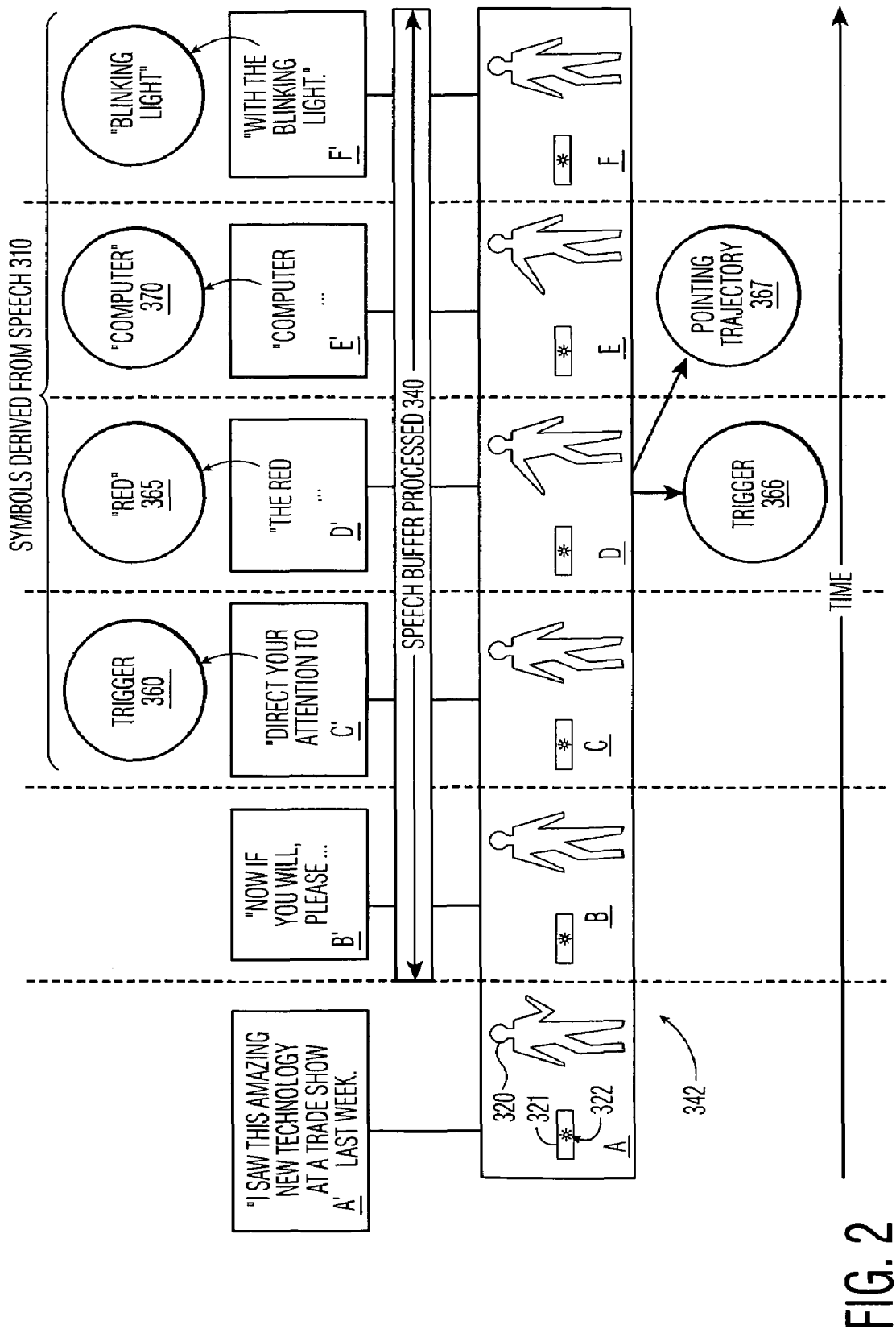
FIG. 2 is a diagram illustrating the processing of speech and gesture inputs in a temporal context.

Referring now to FIG. 2, a storyboard 342 illustrates a scene containing a human FIG. 320 representing a speaker who also controls the video tracking device, a computer 321 with a blinking light 322. The frames A, B, C, D, E, and F represent snapshots of time. In frame A, the speaker is saying the words shown in speech frame A' (The words spoken in frame B are indicated by frame B', those spoken during frame C in C', etc. At the time corresponding to frames A and B, the speaker makes some remarks about an object of interest, namely the computer 321. Then at the time of frame C, the speaker says words that are recognized by the speech processing system of the video tracking system of the invention. The recognition system classifies the speech as a trigger event indicated by the bubble 360. At the time of frame D, the word "red" is recognized as indicated by the bubble 365. Also, at the time of frame D, the gesture of the operator is recognized as a pointing gesture which produces another trigger event 366. At the time of frame D, the images also contain information to derive a pointing trajectory 367 that can be used to acquire the object of interest. At the time of frame E, the word "computer" is recognized as indicated by bubble 370. At the time of frame F, the word "blinking light" is recognized as indicated by bubble 375. The significant time interval is caught in an audio buffer 340 and parsing begins and end with a pause before and after the single sentence A' through F' that was spoken.

Although this particular embodiment consists of two cameras, a similar result can be achieved with one camera capable of performing both functions. The one camera can both receive an input from the operator, e.g., pointing gesture, and acquire a target for display by alternating between focusing on the operator and focusing on the intended target. Switching between the two targets can be triggered by voice commands or by other signals that the system is capable of sensing.

Figure 3:
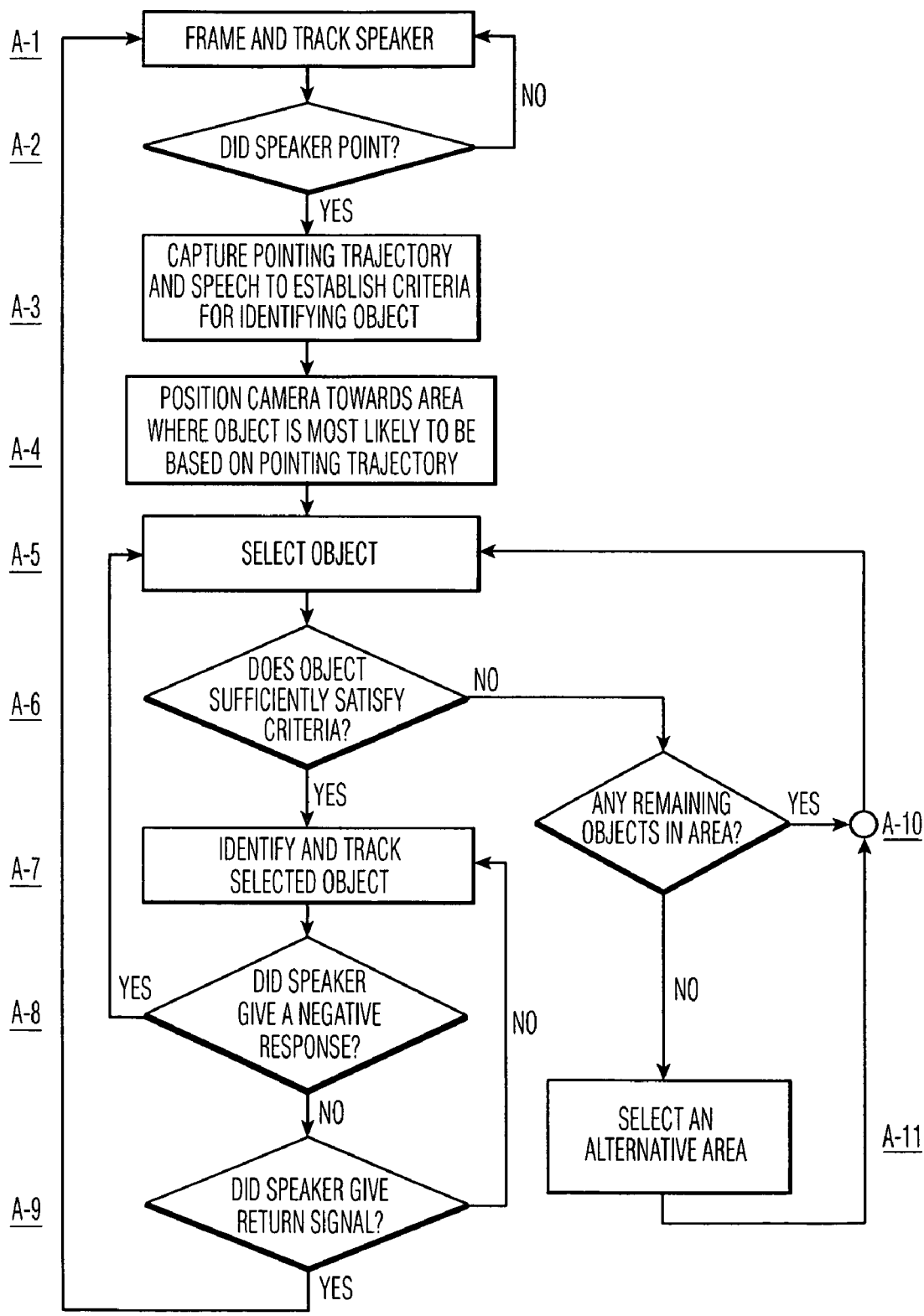
FIGS. 3–5 are flow charts according to alternative embodiments of the invention.

Referring now to FIG. 3, showing one embodiment of the invention, the system frames and tracks the speaker (A-1) until the target acquisition process is triggered by a pointing gesture by the speaker (A-3). In the alternative, the process can be triggered in other ways such as through a voice command, a non-pointing gesture, snapping of the fingers, etc. By pointing to the target, the system can capture the speaker's pointing trajectory and search for the intended target by searching an area most likely to contain the target based on the pointing trajectory and a pre-determined proximity of the nearest object.

The system selects a target (A-5) in the selected area and compares its properties to a criterion (A-6) established based on the inputs until a satisfactory match is found. If the system is unable to locate a satisfactory match in the original search area, the system may then search for targets located in other surrounding areas (A-10, A-11).

Other features of this embodiment include the use of speaker feedback. For instance, if an incorrect target is selected, the speaker can communicate with the system and issue a negative response (A-8), which the system interprets as a command to select another object (A-5). A negative response by the speaker can take various forms such as a verbal command, e.g., "not that object", snapping of the fingers, pressing a button, etc. After the system correctly acquires the correct target, the system listens for an input from the speaker to select a new target or to re-aim the camera back to the speaker (A-1, A-9).

Figure 4:
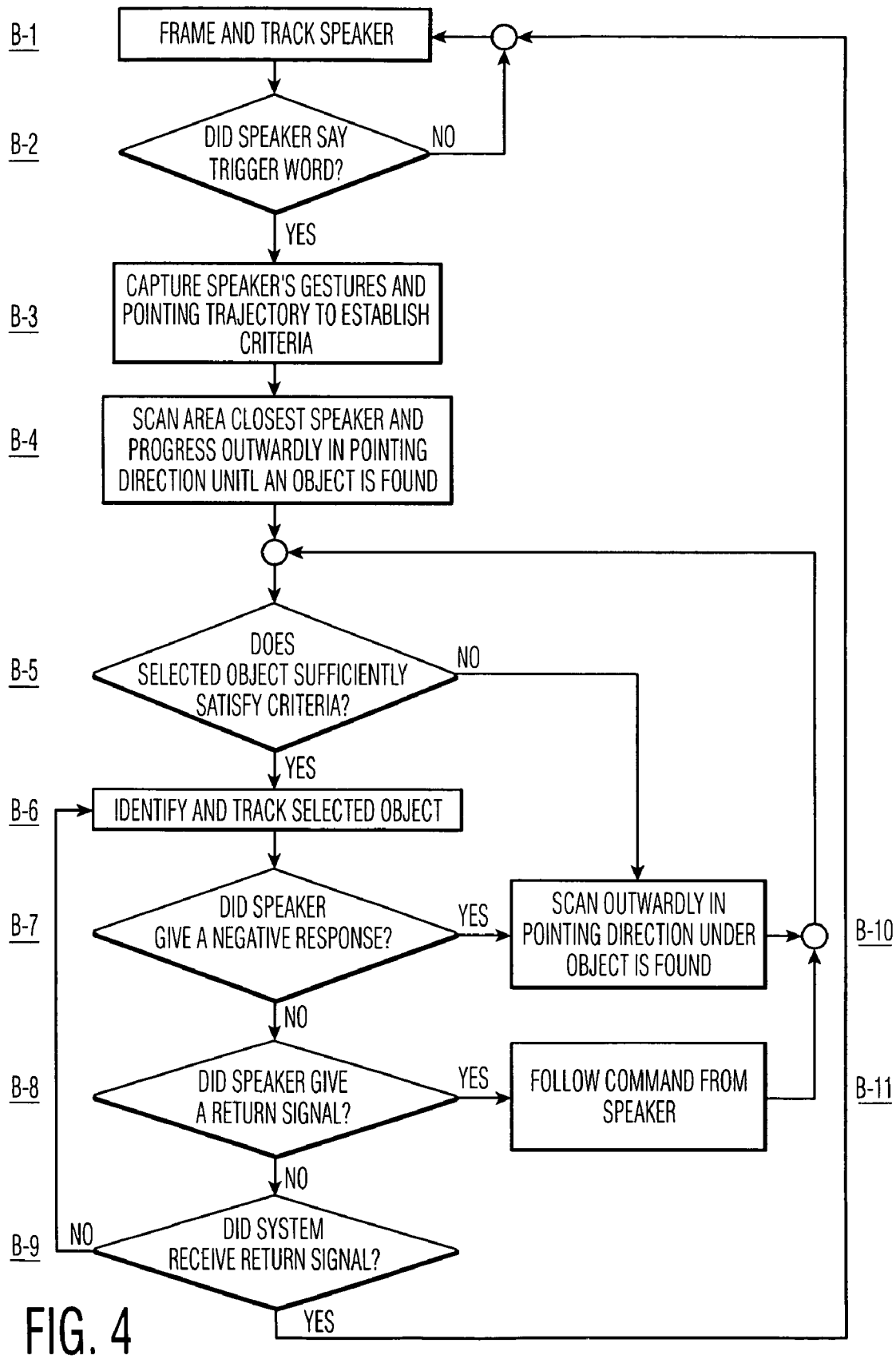

Referring now to FIG. 4, showing an alternative embodiment similar to the embodiment of FIG. 3, the system is triggered by a voice input by the speaker (B-2). The speaker's gestures and additional voice inputs are captured by the system (B-4). The system scans an area in close proximity to the speaker for possible targets (B-4), compares the target to the search criteria (B-5) and progressively searches outwardly in the pointing trajectory (B-10) until a sufficient match is found.

Figure 5:
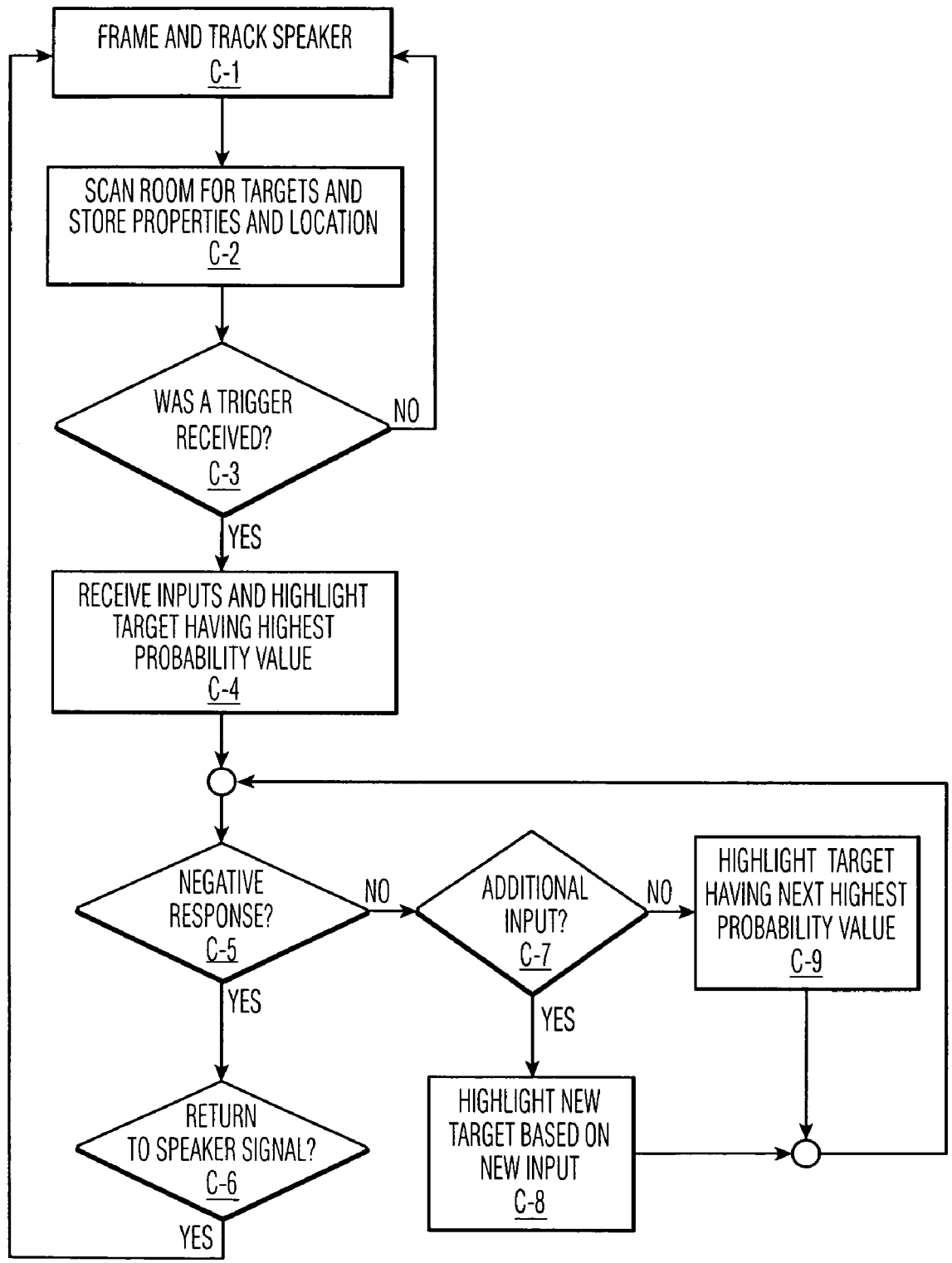

Referring now to FIG. 5, in an alternative embodiment of the invention, the system frames and tracks the speaker (C-1). The system also scans the surrounding area and stores information concerning the machine-sensible properties of possible targets, as well as the location of the possible targets (C-2). Locating possible targets can be based on a number of different search criteria such as targets having a low aspect ratio, objects in the foreground, targets having a certain colors, patterns, etc. After the speaker triggers the targeting process (C-3), the system receives the inputs describing the intended target and highlights the target that is most likely to be the intended target based on the inputs (C-4). The inputs preferably contain at least one input concerning the classification of the target and preferably contain an input concerning the general location of the target. This embodiment also contains feedback features, which allow the system to display the most likely target if the present selection is incorrect.

Figure 6:
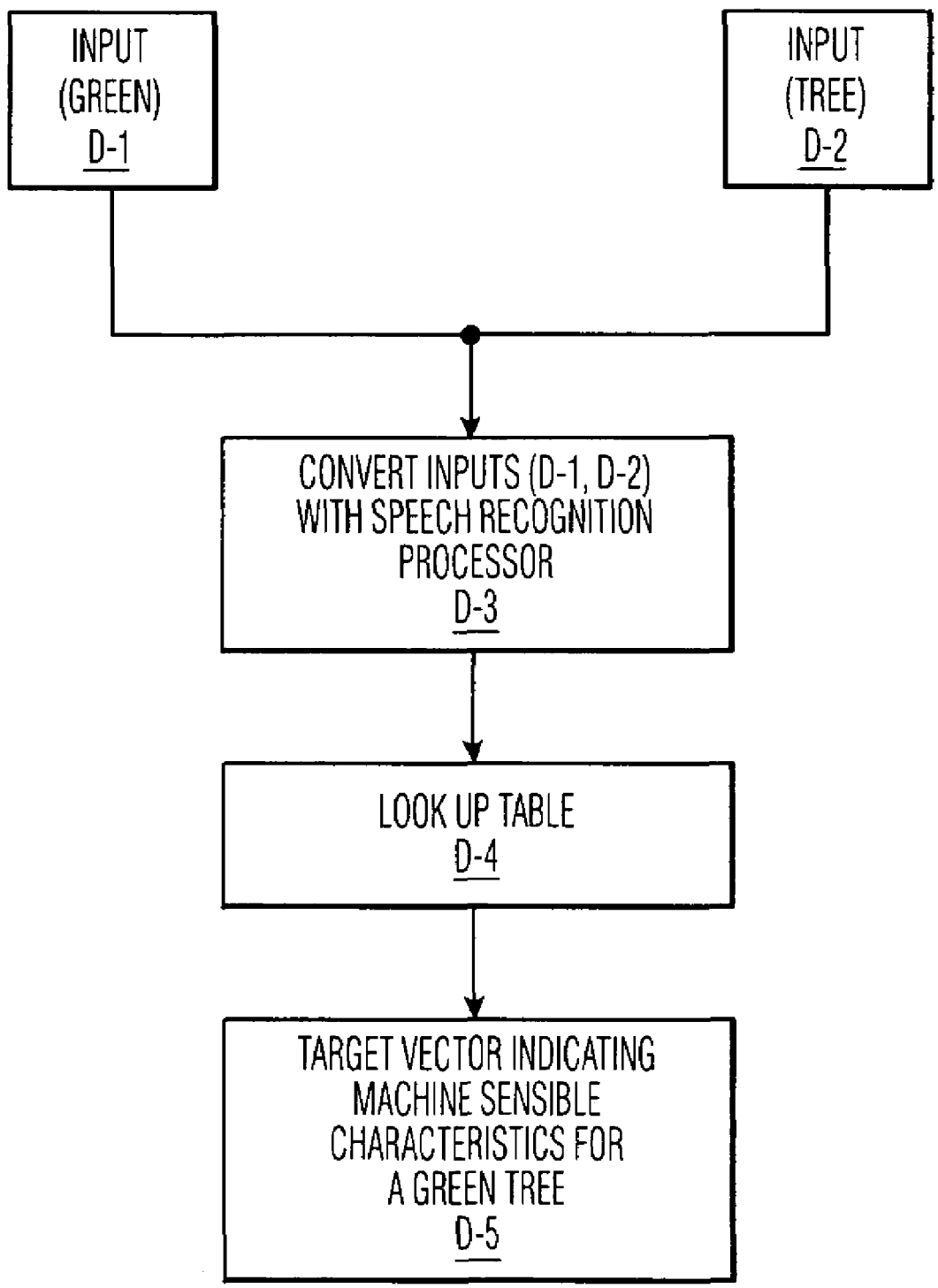
FIG. 6 is a flow chart on a process of converting a voice input to a search target vector.

Referring now to FIG. 6, showing a basic flow diagram of one example of the voice input conversion process, voice inputs "green" and "tree" (D-1, D-2) are received by a speech recognition processor (D-3). These inputs (D-1, D-2) are preferably converted to a machine readable value/signal for use with a look-up table (D-4). The look-up-table converts the input to a target vector (D-5) for use by the system and its sensors to locate the intended target. The vector can include the RGB envelope for green, the shape values and the texture values for an assortment of trees for use with an image sensor, e.g., video camera. The look-up table corresponds different inputs and associates them with the corresponding target vector for locating the target.

Figure 7:
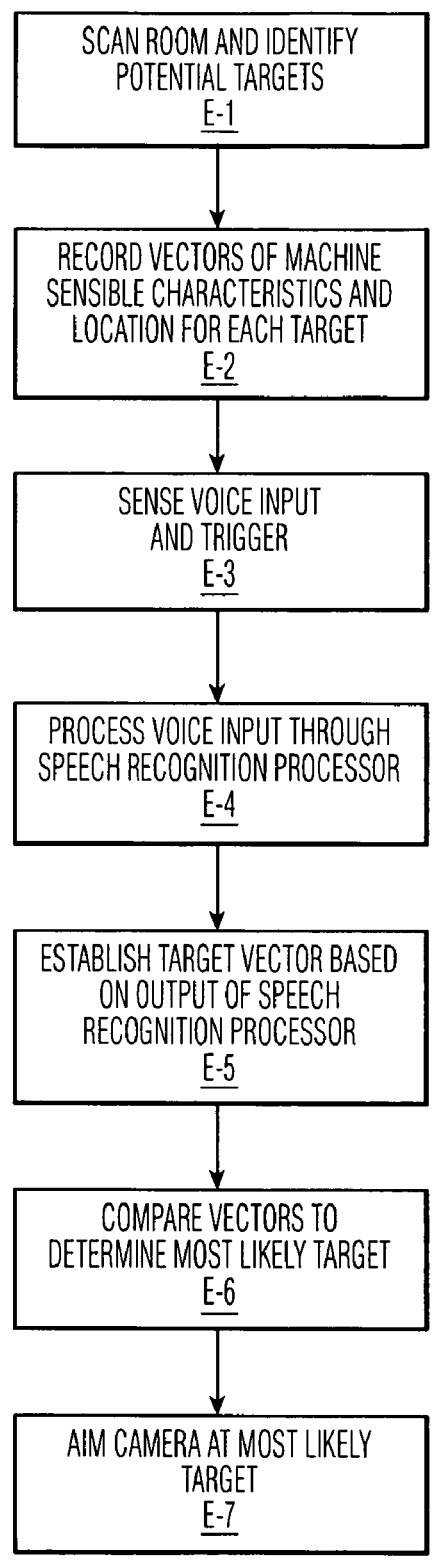
FIGS. 7 and 8 are flow charts of two alternative processes on locating and comparing potential targets.
Figure 8:
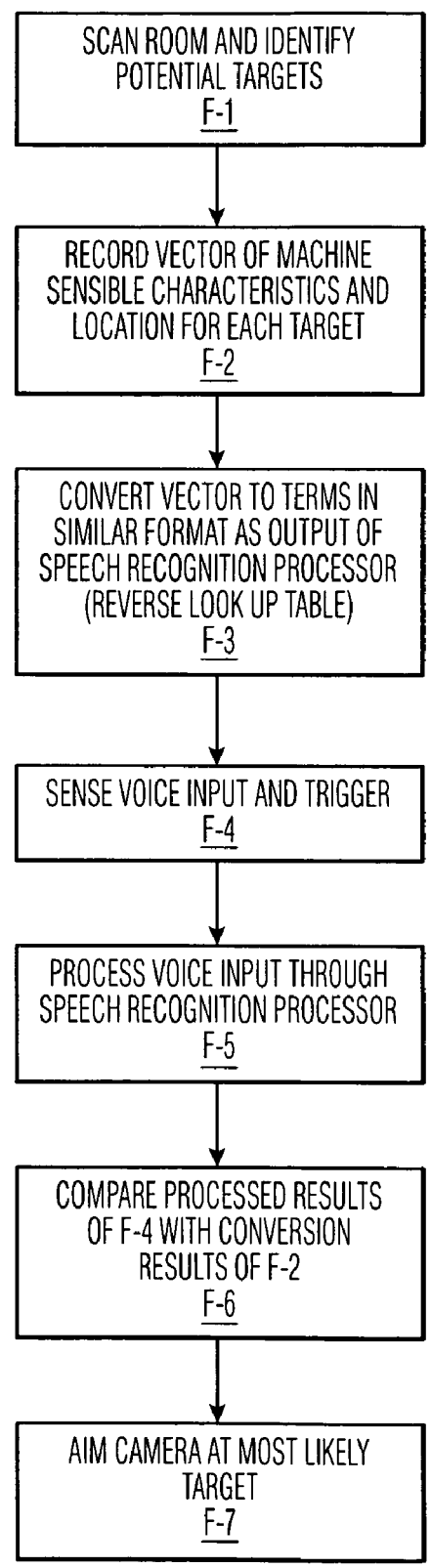

Referring now to FIGS. 7 and 8, in two alternative embodiments of the pre-trigger locating process, the system scans the room to locate potential targets and stores machine sensible characteristics of those potential targets (E-1, E-2, F-1, F-2). The system can locate and identify potential targets through an edge filtering process by one or a number of cameras to determine an object's shape, size and texture and from that information, determine whether the object is a potential target. Further, the system can also choose targets based on its color, whether it makes a sound, or whether an object is a recently placed object in the room based on a recorded memory of the room.

In the first embodiment (FIG. 7), after the operator triggers the locating process, the system receives the voice input and converts the input to a target vector used to locate the target (E-3, E-4, E-5). In the second embodiment (FIG. 8), the likely targets are converted to a format by which the processed voice inputs are compared (F-3). For example, the potential targets can be converted to their commonly recognized term, e.g., a book, and compared to inputs based on those terms.

Figure 9:
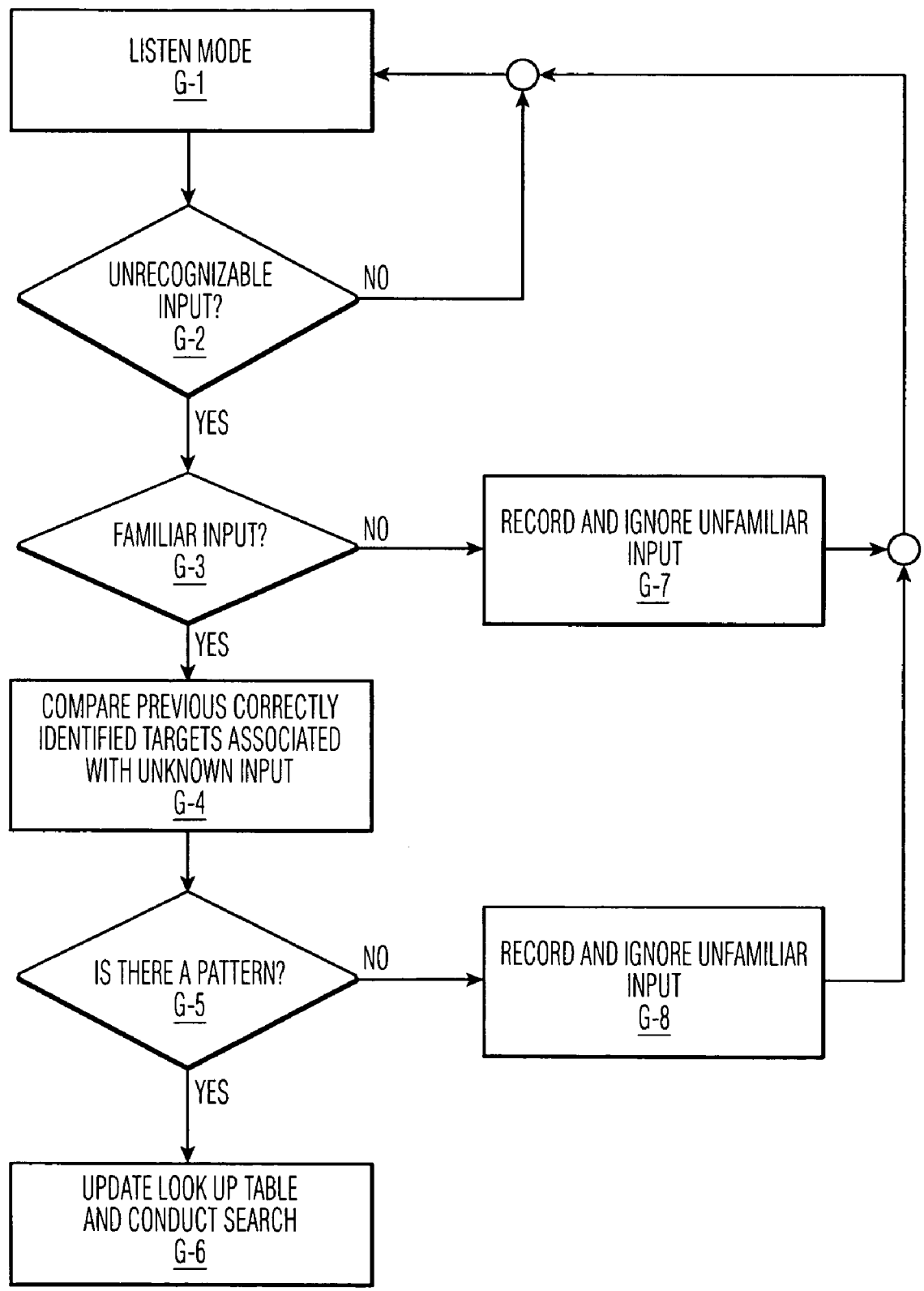
FIG. 9 is a flow chart on the learning process according to one embodiment of the invention.

Referring to FIG. 9, there are a number of different learning processes by which the system can improve its ability to accurately locate the intended target. For example, the system can identify an input that it does not recognize (G-2). It then determines whether the system has ever received this input before and, if so, compares the characteristics of the targets associated with this input. By comparing this input with the machine sensible characteristics of previous, correctly-identified targets associated with this input, the system can identify similarities between the targets to develop a prediction engine to add vectors and associated terms to its look-up table. The addition of new terms to the look-up table can improve its ability to correctly identify the intended target.

The addition of terms to the look-up table can also take place by downloading the new term and its corresponding search vector, such as through the Internet, or through other programming options.

It is evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention be indicated by the appended claims rather than by the foregoing description, and all changes which come within the meaning and range of equivalency of the claims are therefore intended to be embraced therein.

What is claimed is:

1. A method of locating and displaying an image of a target, the method comprising the steps of:
   sensing a triggering event generated by a human operator;
   receiving additional external information that characterizes at least one machine-sensible feature of a target, said receiving step occurring substantially simultaneously with said sensing step; and aiming a camera in response to said sensing and said receiving step, wherein said sensing step includes sensing a gesture indicating a direction of said target.

2. The method of claim 1, wherein said sensing step includes sensing a gesture of a human operator indicating a target.

3. The method of claim 1, wherein said receiving step includes receiving speech from said human operator.

4. The method of claim 3, further including processing said speech for use with at least one machine sensor, said at least one machine sensor and said speech assisting in locating said target.

5. The method of claim 4, wherein said sensing step includes sensing a gesture indicting a direction from said human operator to said target.

6. The method of claim 4, wherein said processing step includes processing said voice information through a look-up table corresponding said speech to search criteria for use with said at least one sensor.

7. The method of claim 6, wherein said look-up table is modifiable.

8. The method of claim 7, wherein said look-up table is modified by receiving information through the on-line global computer network.

9. The method of claim 7, wherein said look-up table is modified to include an additional voice input and a corresponding search criteria, said added voice input and said corresponding search criteria established by comparing previous association of said added voice input with at least one machine sensible characteristic of at least one correctly identified target associated with said voice input, said machine sensible characteristic being a basis for determining said corresponding search criteria.

10. A method of locating and displaying an image of a target, the method comprising the steps of:

scanning an area within the range of at least one sensor;

identifying potential targets;

storing information concerning machine sensible characteristics and locations of said possible targets;

sensing a triggering event, said triggering event generated by a human operator;

receiving additional external information that characterizes at least one feature of said target, said receiving step occurring substantially simultaneously with said sensing step; and aiming a camera in response to said sensing, storing and said receiving steps, wherein said sensing step includes sensing a gesture indicating a direction of said target.

11. A method of aiming a camera at a target, comprising the steps of:

inputting an indication of a position of a target;

inputting further information about a machine-sensible characteristic of said target;

aiming a camera at said target in response to said indication and said further information to reduce an error in said aiming, wherein said inputting an indication step includes inputting a gesture indicating a direction of said target.

12. A method of acquiring a target, comprising the steps of:

inputting spatial information to indicate a position of a target;

inputting further information about said target; and orienting an instrument with respect to said target to acquire said target in response to said spatial information and said further information to reduce an ambiguity in said position, wherein said spatial information includes sensing a gesture indicating a direction of said target.

13. A method as in claim 12, wherein said step of orienting includes orienting a camera.

* * * * *